United States Patent [19]

Greenberg

[11] Patent Number: 4,695,183
[45] Date of Patent: Sep. 22, 1987

[54] MARINE PROPELLER SHAFT/KEY ASSEMBLY

[75] Inventor: Robert Greenberg, Cocoa, Fla.

[73] Assignee: Ray Industries, Inc., Knoxville, Tenn.

[21] Appl. No.: 896,716

[22] Filed: Aug. 15, 1986

[51] Int. Cl.$^4$ ............................ B25G 3/28; F16B 3/00
[52] U.S. Cl. ...................................... 403/356; 403/259
[58] Field of Search ............... 403/356, 358, 259, 318, 403/319

[56] References Cited

U.S. PATENT DOCUMENTS

| 826,944 | 7/1906 | Krieger | 403/356 X |
| 3,862,808 | 1/1975 | Perini | 403/356 X |
| 3,920,343 | 11/1975 | Blue et al. | 403/356 |
| 4,572,698 | 2/1986 | Rauch | 403/356 |

FOREIGN PATENT DOCUMENTS

| 490084 | 1/1930 | Fed. Rep. of Germany | 403/259 |
| 298739 | 10/1928 | United Kingdom | 403/356 |
| 423421 | 1/1935 | United Kingdom | 403/356 |

Primary Examiner—Andrew V. Kundrat
Attorney, Agent, or Firm—William H. Drummond

[57] ABSTRACT

A marine propeller shaft/key assembly in which a keyway formed in the shaft is provided with a perpendicular rounded forward end wall. The key, which transmits rotational forces between the propeller and the propeller shaft, is provided with a rounded perpendicular forward end which matingly engages the forward end of the keyway. The rounded perpendicular end of the keyway forms a stop which precludes axial forward movement of the key in the keyway.

1 Claim, 3 Drawing Figures

MARINE PROPELLER SHAFT/KEY ASSEMBLY

This invention relates to a marine propeller shaft/key assembly.

In a more particular respect the invention pertains to such assembly which is if simplified construction.

In still another and more particular respect the invention concerns a simplified marine propeller shaft/key assembly which is effective to transmit torque from a drive shaft to a marine propeller without jamming the key into the propeller hub/drive shaft keyway either during installation of the propeller on the drive shaft or during operation of the assembly.

Conventional marine propellers have tapered hubs which are typically press-fit on the mating tapered end of a drive shaft. Torque is transmitted from the drive shaft to the propeller by the use of a key carried in a keyway between the shaft and the propeller hub.

A variety of key/keyway shapes and combinations with other elements have been used in the past to prevent movement of the key in the keyway during installation of the propeller and during use of the propeller/shaft combination. Such movement can occur when the propeller is press-fit on the shaft or when the speed or direction of rotation of the propeller is altered or changed.

When the key moves forward in the keyway, the assembly may become misaligned or the key may be jammed in the keyway, setting up stresses which can cause fractures of the shaft and the propeller or which may jam the propeller on the hub, preventing easy removal, when desired.

In an effort to correct these problems, the prior art has utilized tapered keys (U.S. Pat. No. 3,877,828), lateral positioning lugs (U.S. Pat. No. 3,862,808) and radial pins (U.S. Pat. No. 2,563,166; U.S. Pat. No. 1,049,984). A particularly apt illustration of the problem and a relatively complicated marine propeller shaft/key assembly is disclosed in the recently issued U.S. Pat. No. 4,572,698.

The principal object of the present invention is to provide a marine propeller shaft/key assembly which is simplified, both in manufacture and structure.

Still another object of the invention is to provide such an improved assembly which prevents the above-described assembly, operational and disassembly problems.

Still another and more particular object of the invention is to provide such an improved assembly which is less expensive to manufacture and which can be used by persons of only ordinary skill in installing and removing marine propellers.

These and other, further and more specific objects and advantages of the invention will be apparent to those skilled in the art from the following description thereof, taken in conjunction with the drawings, in which.

Figure 1:
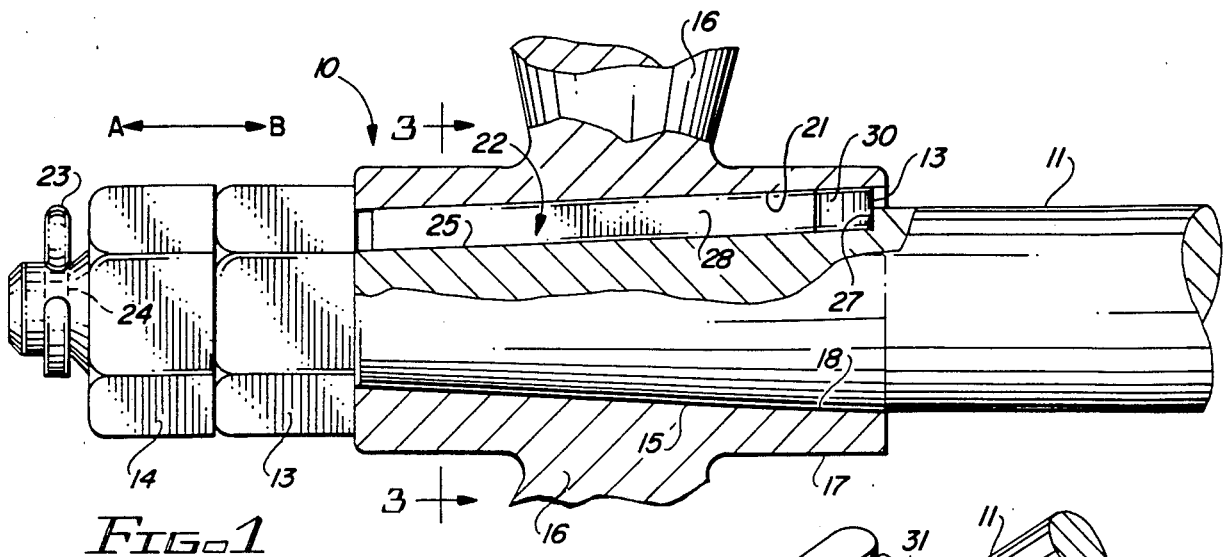
FIG. 1 is an assembly view of a marine propeller/key configured in accordance with the presently preferred embodiment of the invention.

Briefly, in accordance with the invention, I provide a marine propeller shaft/key assembly which includes the general components of the prior art, but in which the prior art assemblies are improved by providing specially shaped keyways and a specially shaped mating key.

The components of such prior art assemblies generally include a shaft for use in driving the propeller and a propeller having a hub which is matable with the shaft. The shaft typically includes an aft end portion threaded to accept a propeller retaining nut and a tapered portion adjacent the threaded aft end portion. The propeller has a tapered interior hub which mates with the tapered portion of the shaft. An axial keyway is provided in each of the tapered shaft and hub portions and the propeller is moved on the shaft and locked in place by a locking nut on the threaded aft portion of the shaft.

The improved assembly of the present invention provides an axial keyway in each of the tapered propeller hub and shaft portions. The shaft keyway includes an axially extending floor, axially extending side wall surfaces perpendicular to the floor and an end wall perpendicular to the floor at the forward end of the keyway. The improved assembly of the invention also includes a key shaped and dimensioned to be slidably received in the axial keyways when the keyways are in angular registration. The end wall of the shaft keyways forms a stop which precludes axial movement of the key forwardly in the shaft keyway.

Turning now to the drawings which depict the presently preferred embodiment of the invention and in which like reference numerals are used to identify the same elements in the several views, the shaft/key assembly of the invention, generally indicated by reference numeral 10, includes a propeller drive shaft 11, the aft end portion 12 of which is threaded to accept propeller retaining nuts 13 and 14. Adjacent the threaded aft end portion 12, a tapered portion 15 is provided.

A marine propeller 16, only the central portion of which is shown, includes a hub portion 17 having a tapered internal bore 18.

Axial keyways 21 and 22 are formed respectively in the tapered portion 15 of the shaft 11 and in the tapered internal bore 18 of the propeller hub 17.

The propeller hub 17 is retained on the shaft by locking nuts 13 and 14. In practice, the locking nut 13 is advanced on the threads 11 to slightly press-fit the hub 17 onto the tapered portion 15 of the shaft 11. After this press-fitting operation is complete a jam nut 14 is then advanced on the threads 12 to lock both nuts 13 and 14 into the propeller hub retaining position shown in FIG. 1. A cotter pin 23 is then inserted through a hole (shown by dashed lines 24) in the terminal end 12 of the shaft 11 to further secure the locking nuts 13 and 14 in the propeller retaining position shown in FIG. 1.

According to the improved assembly provided by the present invention, the keyway 22 formed in the tapered portion 15 of the shaft 11 is specially shaped by machining the tapered portion 15 to provide a floor 25, axially extending side walls 26 and an end wall 27 at the forward end of the keyway 22. This end wall 27 is substantially perpendicular to the floor 25 of the keyway 22.

Figure 3:
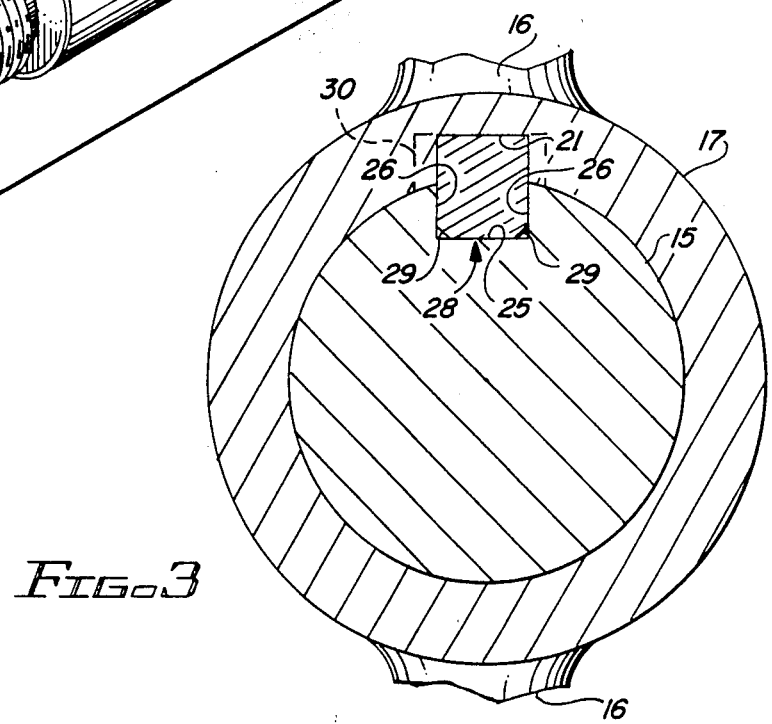
FIG. 3 is a sectional view of the assembly of FIG. 1, taken along section line 3—3 thereof.

A suitable key 28 is provided which is shaped and dimensioned to be slidably received in the axial keyways 21 and 22 when these keyways are in angular registration, as shown in FIGS. 1 and 3. The end wall 27 of the shaft keyway 22 forms a shoulder or "stop" which precludes axial movement of the key 28 forwardly (in the direction of the arrow A) in the keyway 22. This stop prevents the key 28 from being accidentally misplaced from its operative position (as shown in FIG. 1) during installation of the propeller 16 on the shaft 11 and during operation of the assembly 10. It is not necessary, contrary to the teachings of the prior art, to provide any means for preventing axial movement of the key 28 rearwardly in the direction of the arrow B. In fact, in the presently preferred embodiment of the invention, the key 28 is somewhat shorter than the length of the keyway 22 (as shown in FIG. 1).

Further, in accordance with the preferred embodiment of the invention, the key 28 is dimensioned to be slidably received in the keyways as shown in FIGS. 1 and 3, such that the key 28 is not compressably loaded by the press-fitting operation described above, the sole function of the key 28 being to transmit torque loads from the shaft 11 to the propeller 16.

Figure 2:
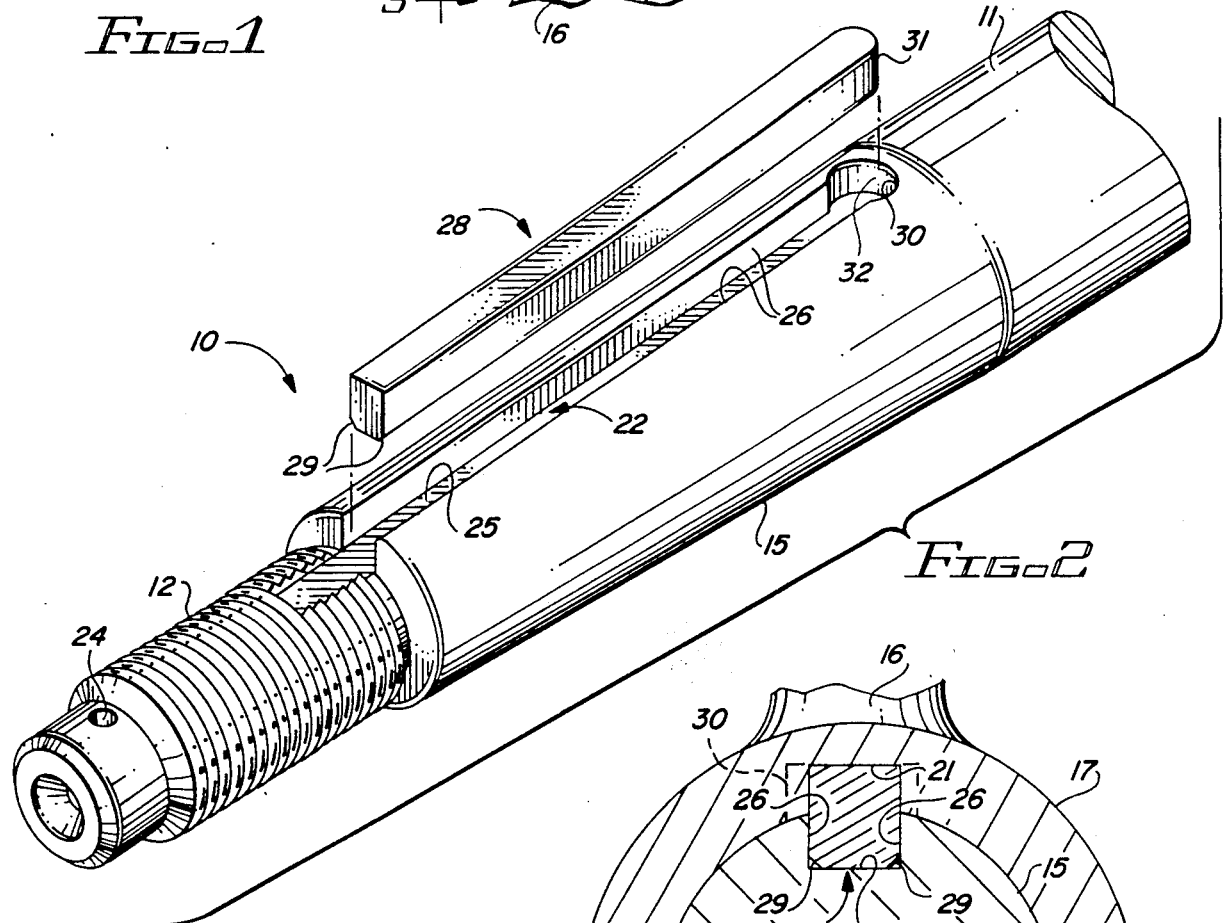
FIG. 2 is an exploded perspective view of the shaft and key of FIG. 1.

Desirably, the lower edges 29 of the key 28 are chamfered (as more clearly shown in FIG. 3) and the forward ends 31 and 32 of the key 28 and shaft keyway 22 are matingly rounded (as shown in FIG. 2) to prevent "hard spots" which might set up stresses in the shaft 11 during installation and operation which might cause fracture of the shaft 11. Optionally, to further reduce the liklihood of such stresses, the forward end of the shaft keyway 22 can be provided with a circular recess 30, the diameter of which is greater than the width of the keyway 22.

Thus, as will be apparent to those skilled in the art by the foregoing description and drawings, I have provided a marine propeller/shaft assembly in which the arrangement for keying the propeller to the drive shaft does not require the use of a key and mating keyway or keyways with specially machined projections or specially installed pins, pin-spring combinations and the like. Instead, the desired result, prevention of forward movement of the key in the keyway can be achieved by simply providing the stop at the forward end of the shaft keyway rather than the usual outwardly inclined ramp, e.g., as shown in U.S. Pat. Nos. 3,862,808 and 4,572,698.

Having described my invention in such terms as to enable those skilled in the art to understand and practice it and, having described the presently preferred embodiments thereof, I claim:

1. In a marine propeller shaft/key assembly, said assembly including
   a shaft for use in driving a propeller, said shaft having
      an aft end portion threaded to accept propeller retaining nut means, and
      a tapered portion adjacent said aft end portion,
   a propeller having a tapered interior hub portion which is matable with the tapered portion of said shaft,
   an axial keyway in each of said tapered portions,
   said hub portion being retained on said shaft by locking nut means on said threaded aft end portion,
the improved assembly comprising:
   (a) axial keyway means in said tapered portion of said shaft, including
      (i) an axially extending floor,
      (ii) axially extending side wall surfaces, and
      (iii) an end wall perpendicular to said floor at the forward end of said keyway, said perpendicular end wall being part of an enlarged rounded extension of said side wall surfaces; and
   (b) key means shaped and dimensioned to be slidably received in said axial keyways when said keyways are in angular registration, the forward end of said key being curved to matingly engage the rounded end wall of said shaft keyway, said end wall of said shaft keyway forming a stop which precludes axial movement of said key forwardly in said keyway.

* * * * *